US007203356B2

(12) United States Patent
Gokturk et al.

(10) Patent No.: US 7,203,356 B2
(45) Date of Patent: Apr. 10, 2007

(54) SUBJECT SEGMENTATION AND TRACKING USING 3D SENSING TECHNOLOGY FOR VIDEO COMPRESSION IN MULTIMEDIA APPLICATIONS

(75) Inventors: Salih Burak Gokturk, Mountain View, CA (US); Abbas Rafii, Palo Alto, CA (US)

(73) Assignee: Canesta, Inc., Sunnyvale, CA (US)

( * ) Notice: Subject to any disclaimer, the term of this patent is extended or adjusted under 35 U.S.C. 154(b) by 847 days.

(21) Appl. No.: 10/411,674

(22) Filed: Apr. 11, 2003

(65) Prior Publication Data

US 2003/0235341 A1 Dec. 25, 2003

Related U.S. Application Data

(60) Provisional application No. 60/408,445, filed on Sep. 4, 2002, provisional application No. 60/408,444, filed on Sep. 4, 2002, provisional application No. 60/376,944, filed on Apr. 11, 2002.

(51) Int. Cl.
*G06K 9/00* (2006.01)

(52) U.S. Cl. ..................... 382/154; 382/239

(58) Field of Classification Search ............... 382/282, 382/154, 103, 165–166, 115–118, 168, 171, 382/173, 190, 232–251; 348/14.01, 14.16, 348/169–174, 211.12; 375/240.01–240.25; 362/464; 702/72, 57; 356/3.03, 3–3.01, 356/3.13; 345/419
See application file for complete search history.

(56) References Cited

U.S. PATENT DOCUMENTS 3,610,754 A    10/1971  Pirlet .................. 356/3.03

| 4,294,544 | A |  | 10/1981 | Altschuler | .................. 400/320 |
|---|---|---|---|---|---|
| 5,442,573 | A |  | 8/1995 | Bredberg | .................. 702/172 |
| 5,654,800 | A | * | 8/1997 | Svetkoff et al. | ............. 356/602 |
| 5,733,031 | A |  | 3/1998 | Lin | .................. 362/464 |
| 6,389,163 | B1 | * | 5/2002 | Jodoin et al. | .................. 382/173 |
| 6,404,920 | B1 | * | 6/2002 | Hsu | .................. 382/190 |
| 6,526,169 | B1 | * | 2/2003 | Murching et al. | .......... 382/168 |
| 6,532,302 | B2 | * | 3/2003 | Krtolica | .................. 382/173 |
| 6,819,796 | B2 | * | 11/2004 | Hong et al. | .................. 382/173 |

FOREIGN PATENT DOCUMENTS

| EP | 0 370 770 A | 5/1990 |
|---|---|---|
| GB | 1073 503 A | 6/1967 |
| WO | WO 02/21502 A1 | 3/2002 |

OTHER PUBLICATIONS

Ventor et al., Stereo imaging in low bit rate video coding, IEEE INSPEC Accession No. 367772, pp. 115-118.*
Van Schalkwyk et al., Low bit rarte video coding with depth compensation, IEEE INSPEC Accession No. 47211787, pp. 11149-11153.*
Eisert P. et al., Rate distortion efficient video compression usin 3-d head model, INSPEC A ccession No. 6522072, pp. 217-221.*
Lee et al., A neuro fuzzy approach for segmentation of human object sequence, IEEE issn 1083-437, pp. 420-437.*
Ding et al., Application specific image compression for virtual conferencing, , Information Technology coding and computing 2000, pp. 1-6.*

* cited by examiner

*Primary Examiner*—Ishrat Sherali
(74) *Attorney, Agent, or Firm*—Shemwell, Mahamedi LLP

(57) ABSTRACT

Three-dimensional position information is used to segment objects in a scene viewed by a three dimensional camera. At one or more instances of an interval, the head location of the user is determined. Object-based compression schemes are applied on the segmented objects and the detected head.

40 Claims, 8 Drawing Sheets

US 7,203,356 B2

SUBJECT SEGMENTATION AND TRACKING USING 3D SENSING TECHNOLOGY FOR VIDEO COMPRESSION IN MULTIMEDIA APPLICATIONS

PRIORITY INFORMATION

This application claims benefit of priority to the following provisional applications:

Provisional U.S. Patent Application No. 60/376,944, entitled "Using 3D Sensing Technology in Object Segmentation for Video or Image Compression," filed Apr. 11, 2002, naming Salih Burak Gokturk as inventor (hereby incorporated by reference for all purposes);

Provisional U.S. Patent Application No. 60/408,444, entitled "Using 3D Sensing Technology in Object Segmentation for Instant Messaging and Wireless/Wireline Video Conferencing Applications," filed Sep. 4, 2002, naming Abbas Rafii and Salih Burak Gokturk as inventors (hereby incorporated by reference for all purposes); and Provisional U.S. Patent Application No. 60/408,445, entitled "A Head Detection and Tracking System Based on Depth Images," filed Sep. 4, 2002, naming Salih Burak Gokturk as inventor.

FIELD OF THE INVENTION

The present invention relates to a perception technology. In particular, the present invention relates to using three-dimensional perception technology to group objects in a scene in an image, and treating each segment separately to achieve high compression rate for applications that require an efficient method for storage or transmission of the image.

BACKGROUND OF THE INVENTION

Electronic systems exist for capturing the three-dimensional range image of the environment. For example, stereovision, structured light methods, and time-of-flight methods are some examples of these systems.

There are object based compression systems in the literature as well. For instance, MPEG4 is a protocol that permits the use of various compression schemes for different objects in the scene.

There are also various methods that segment the objects in an image. These methods are intended for two-dimensional images. For example, U.S. Pat. No. 6,404,920, features the use of the fundamental concept of color perception and multi-level resolution to perform scene segmentation and object/feature extraction in the context of self-determining and self-calibration modes. The technique uses only a single image, to do object segmentation, and then matches the segmented image with libraries of objects in a system database. This method is intended for two-dimensional image based segmentation.

U.S. Pat. No. 6,404,920 describes a three-dimensional reference image segmenting method and device, where a two-dimensional image of a reference object and a shape data of a pattern obtained by transforming the image are stored together with depth data of the reference object in a memory as a reference pattern. On the basis of a local Fourier transform image data of an input image supplied from an image transform unit and the reference data of the reference pattern read out from the memory, a deform amount estimating unit calculates the amount of deformation (displacement vector) required to make both the images coincident with each other to a possible extent. This method also utilizes two-dimensional image for segmentation.

There have been many other attempts to apply two-dimensional imaging to object segmentation. In U.S. Pat. No. 6,532,302, a sample image is segmented by an image segmentation system including a size reduction unit, which reduces the size of the image, and, at the same time, fills small gaps between foreground pixels. Thereafter, a connected component analyzer identifies connected components and their associated minimum bounding rectangles in the reduced image. Next, a target object filter searches the connected components for target objects, making use of a target object library to identify target objects characterized by such parameters as size, shape, and texture. U.S. Pat. No. 6,389,163 provides a method and apparatus for automatic image segmentation using template-matching filters. The invention generally segments differing binary textures or structures within an input image by passing one or more structures while removing other structures.

There have also been attempts to segment the objects in videos of two-dimensional images. U.S. Pat. No. 6,526,169 describes a histogram-based segmentation of an image, where frame or picture of a video signal is separated into objects via color moments. A defined area is characterized by its color information in the form of a limited set of color moments representing a color histogram for the area. Based upon the set of color moments, objects that belong to various parts of the histogram are identified.

There has been some prior art regarding the use of depth information for increasing the quality and efficiency of compression algorithms. For instance, in "Stereo Imaging in Low Bitrate Video Coding," by M. A. H. Venter et al., published in COMSIG 1989—Proceedings South Africa Conference [of] Communication Signal Processing, pp. 115–118 (IEEE Jun. 23, 1989), video compression techniques that use a stereo imaging depth data are described. In these techniques, Venter et al. generates a "motion vector" from the depth data as a check on the accuracy of motion vectors, which are generated in a compression-coding algorithm. Venter et al. also proposes to model the three-dimensional shape of the moving object for further reference check.

In another method that is disclosed in "Low Bitrate Video Coding with Depth Compensation," by J. J. D. van Schalkwyk et al., published in IEEE Proceedings: Vision, Image and Signal Processing, Vol. 141, No. 3, pp. 149–53 (1994), the depth information from a stereo camera system is used to separate the moving foreground objects from the static background. Then, the motion vectors are generated by comparing the object's three-dimensional position in the current and the previous frames. These motion vectors are then used in the compression process to generate a more accurate representation of the scene.

In another method described in "Image Sequence Coding Using 3D Scene Models," by Bernd Girod, published in the Proceedings of SPIE—The International Society for Optical Engineering, Vol. 2308, pp. 1576–1591 (SPIE 1994), a depth information is first captured to construct a shape model of a person's head. In the video compression mode, a regular two-dimensional camera is used and the shape model is matched to the image and the shape parameters such as the translation, rotation and facial motion parameters are sent to the receiver side for a better construction of the images.

U.S. Pat. No. 6,526,169 describes a method that uses three-dimensional data for object-based compression. The method uses the depth-from-focus technique as three-dimensional sensor. The method also uses histogram-based segmentation to separate different objects in the scene. This patent does not infer any relation to the subjects, i.e. users of such a system.

In general, the image-based segmentation is inherently problematic since different objects may have same or similar colors in the image, making it impossible to separate objects. The current invention suggests the use of three-dimensional data for this purpose, and provides ways of applying segmentation to three-dimensional data, and identifying the head of a person in an image. The segmented data can be used in many applications, including but not limited to video compression, video segmentation, videophones and multimedia instant messaging applications.

The above-mentioned three-dimensional prior art techniques fail to adequately bridge the gap between current video compression techniques and three-dimensional image retrieval techniques. In the above-mentioned techniques, three-dimensional image capture is either used indirectly, to have a better prediction scheme, or to check the accuracy of the motion vectors created by the two-dimensional capturing mechanism, or the techniques do not relate to the detection of its subjects. Furthermore, such techniques as described do not constitute of time-of-flight techniques that have performance and practical advantages.

SUMMARY OF THE INVENTION

A method is provided that enables the segmentation and tracking of foreground subjects in video images, using 3D sensing, and compressing the images by transmitting only the foreground segments to reduce bandwidth usage in distributed multimedia applications over wireline and wireless channels. The method includes obtaining position information for a plurality of discrete regions on a body part of the person, and the background. The position information indicates a depth of each discrete region on the body part relative to a reference. The body and the head are identified using head detection and tracking. In one embodiment, the segmentation results are used for efficient video compression, where different parts of the body, and the background are compressed in different fashions or quality. In another embodiment, the compressed images of the participants in a video conferencing or multimedia instant messaging are transmitted to substantially improve the quality of video images even with low bandwidth channels.

Embodiments described herein provide direct use of three-dimensional capture techniques whereby the scene is divided into its subject(s), and each subject or each body part of the subject is coded accordingly with its relevancy to the application. Putting the attention into the subjects is critically important since most of the applications based on this technology, such as video-telephony, instant messaging, and video conferencing, etc. put most of the attention on its subjects.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 5.$b$ illustrates the binarized version of the depth image given in FIG. 5.$a$.

FIG. 5.$c$ illustrates the application of pattern based head detection.

DETAILED DESCRIPTION OF THE INVENTION

Figure 1:
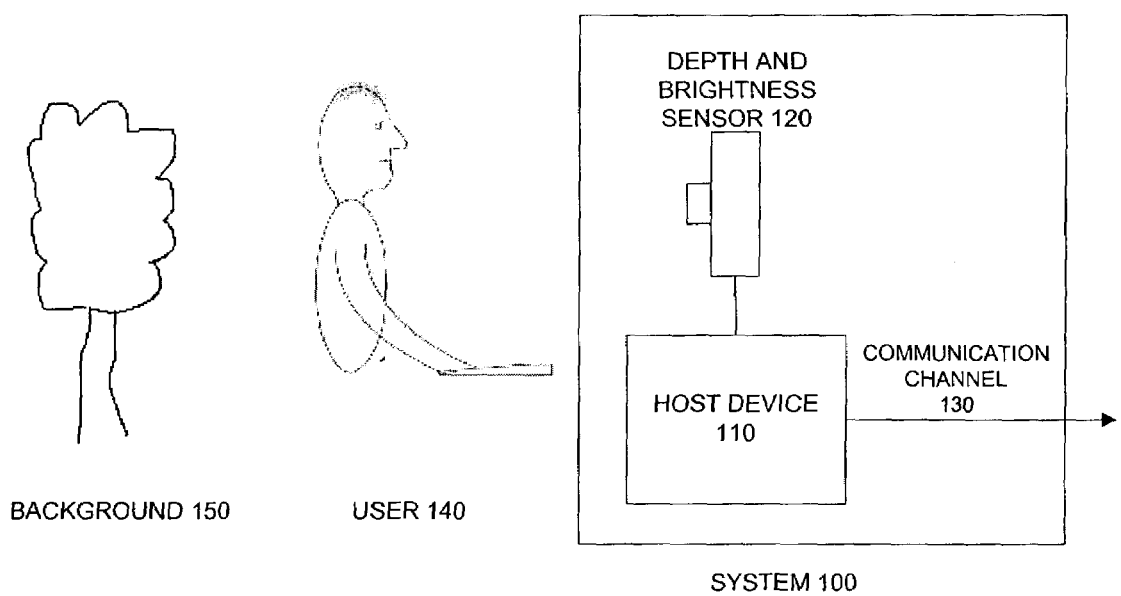
FIG. 1 describes the apparatus for an embodiment of the current invention.

Embodiments of the invention describe methods and apparatuses for applying subject segmentation and identification using 3D images and applications that benefit from the invention. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention provide for techniques that can be employed to segment objects, specifically human forms, in a scene and identify the head location of a person. The invention describes a class of segmentation algorithms that use three-dimensional sensing to differentiate between the foreground and the background objects in an image. Three-dimensional sensors provide a depth map of the scene. This map can be used to segment the objects that are at a certain range of distance to the sensor. Specifically, the head of a person can be identified in the depth image and can be tracked over time.

One application for such a segmentation system is in object based image/video compression for multimedia applications, where different objects in the image are compressed in different fashions. Examples of applications that can use object-based compression are instant messaging, video conferencing, and wireless or wire-line video-telephony applications.

In one embodiment of the invention, the methodology has various stages. The first stage amounts to obtaining the three-dimensional images. Next, the scene is segmented to various objects using the obtained three-dimensional images. Optionally, the head may be detected and tracked in, for example, video-phone applications, since the highest quality coding would occur around the head and face in those applications. The final stage is the compression of the scene, using object-based compression.

Embodiments of the invention provide several advantages over other approaches that apply object segmentation using two-dimensional images. In contrast to existing systems, embodiments of the invention enable a system to reliably segment the objects and subjects in the scene. In one embodiment, the foreground and the background are separated from each other. In addition, the invention provides a mechanism to identify the head location and shape from three-dimensional images, which can be used for object-based compression.

A major drawback of existing object-based compression methods is that they do not provide a reliable means to separate the objects and subjects in the scene. Systems built on this invention would provide an enabling means for object-based compression applications, such as in videophones, in video-conferencing, and in instant messaging applications.

B. Terminology

The term "image" means an instance of light recorded on a tangible medium. The image does not have to be a recreation of the reflection, but merely record a characteristic such as brightness, particularly from various points of a surface or area in which a reflection is being created. The tangible medium may refer to, for example, an array of light-sensitive pixels.

The term "depth" means a depth-wise distance. The depth refers to a distance between a sensor and an object that is being viewed by the sensor. The depth can also be a relative term such as the vertical distance from a fixed point in the scene closest to the camera.

The term "three-dimensional sensor" refers to a special type of sensor where each pixel encodes the depth information for the part of the object that map to that pixels. For instance, U.S. Pat. No. 6,323,942, titled "CMOS-compatible three-dimensional image sensor IC" is an example of such a sensor.

The term "subject" refers to the person that is of interest to a system described in this invention. In many applications, the subject is the user of the system.

C. System and Method

FIG. 1 illustrates an embodiment of a system 100 which includes a host device 110, a depth and brightness sensor 120, and a communication channel 130. The user 140 can use the system 100 for sending his image or video to another receiver through the communication channel 130. The system 100, separates the user (subject) 140 from the background 150 and sends only the user image, and saves bandwidth.

The host device 110 can be any computer-readable medium, such as but not limited to a personal computer, a laptop, a handheld computer (such as a personal digital assistant or "PDA"), a cell phone, a pen tablet, a regular phone, or a screen. The communication channel 130 can be through any communication medium, such as telephone lines, local area network, wide area network, digital subscriber lines ("DSL"), or wireless media. The depth-brightness sensor 120 can be any depth sensor. If the depth sensor does not provide the brightness images, then an additional camera can be used for this purpose.

A system such as described in FIG. 1 is invariant to the type of three dimensional sensor system 120 that is used. In one embodiment, the system uses the three-dimensional sensor system that is described in U.S. Pat. No. 6,323,942 (hereby incorporated by reference in its entirety for all purposes). This patent describes a system that sends out a pulse of light to a targeted region, and measures the time that the pulse takes to travel. This sensor provides a cost-effective and reliable solution. Another type of three-dimensional sensor is a stereo-camera method. This type of sensor system uses two cameras and finds the location of every corresponding point in both images. An example of such a sensor system is described in literature such as Machine Vision, by Ramesh Jain, Rangachar Kasturi, Brian G. Schunck, published by McGraw-Hill in 1995. Another type of three-dimensional sensor is structured light methods, where a structured light of known pattern is projected on to the scene. A camera image is analyzed whereby the three dimensional geometry of the scene is calculated from the way the projected pattern appears in the image.

An object based compression system involves two main components, an encoder (sender), and a decoder (receiver). The encoder side applies the processing to segment the images, applies compression and sends them. The decoder side reconstructs the received images.

Figure 2:
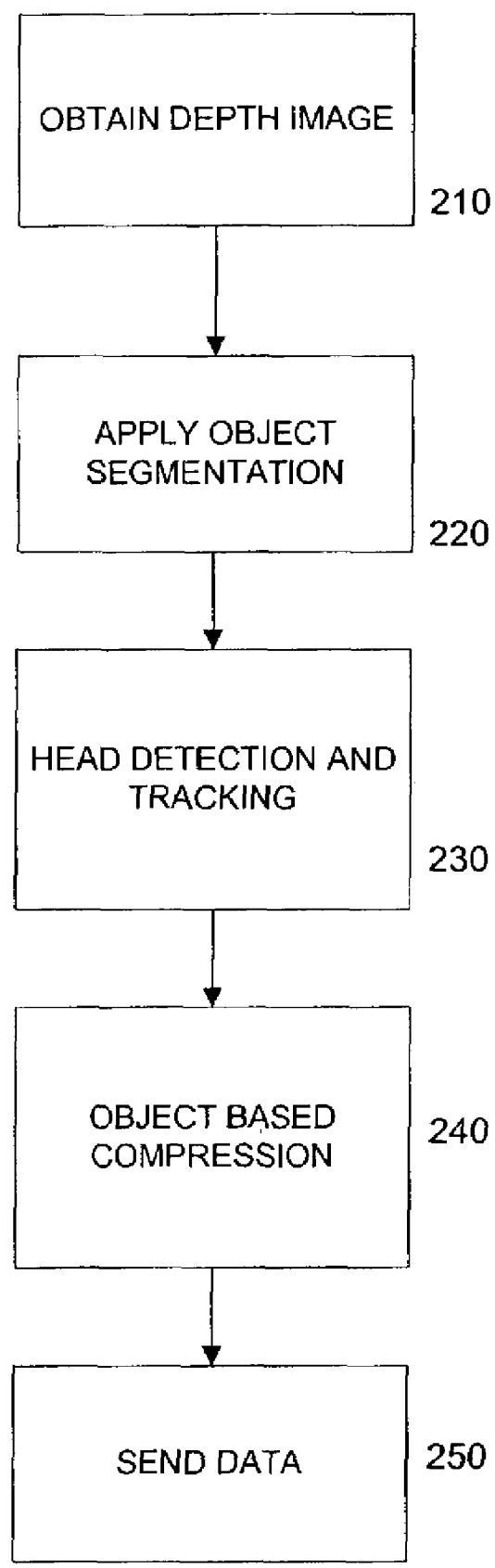
FIG. 2 illustrates a method for implementing the encoder portion of an object based compression scheme with 3D sensing and segmentation.

FIG. 2 illustrates the steps of a method in encoder side for applying object-based compression with the current invention. Reference to numerals of FIG. 1 are made for illustrative purposes only. In 210, a depth image is obtained using the three-dimensional sensor 120. In 220, object segmentation is applied to the depth images. Step 230 provides the head of the person is detected and tracked. In 240, object based compression is applied. Different objects can be compressed with different quality. For instance, the head might be compressed with high quality, the body with medium quality. The background can be compressed with low quality or could be totally suppressed. In 250, the images are sent through the communication channel 130.

Figure 3:
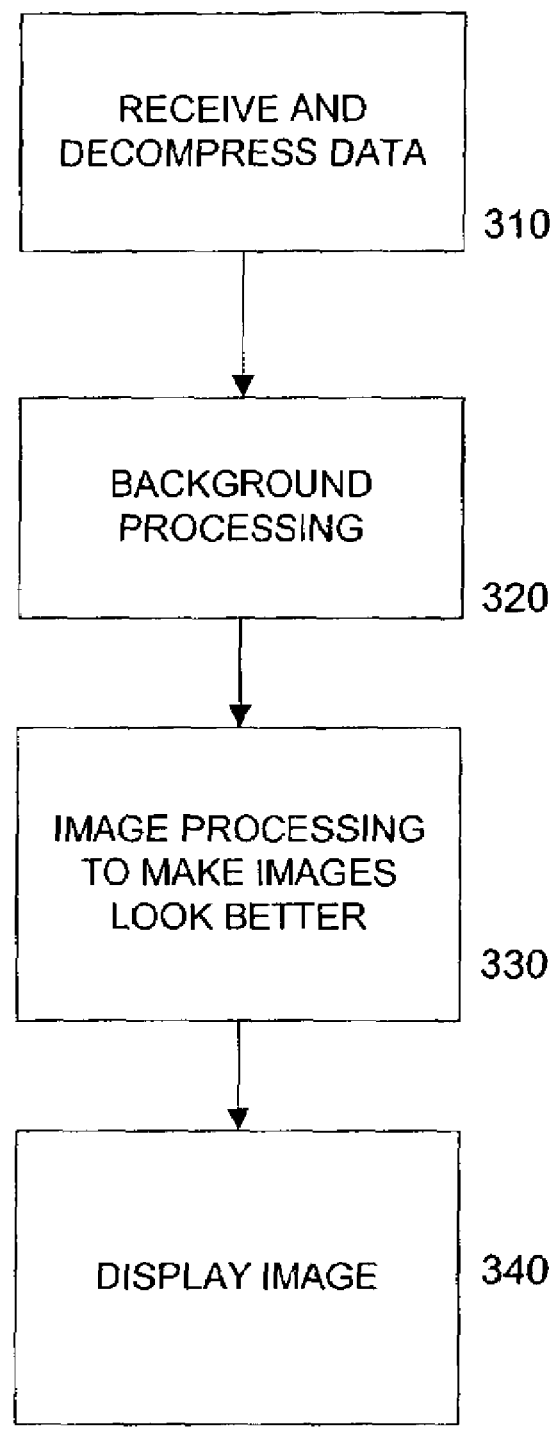
FIG. 3 illustrates a method for implementing the decoder portion of an object based compression scheme with 3D sensing and segmentation.

FIG. 3 illustrates the steps of the algorithm in the decoder side. In step 310, the received images are decompressed. The decompressed images can be such that the background is suppressed and only the foreground objects are sent. In this case, step 320 applies background processing, where the background of the received foreground is filled by a replacement. This replacement can be either a still image, such as the image of a nice beach, or mountains, a still image of the background in the encoder side, or another video. Usually, some distortion appears on the borders of the foreground when a new background is placed. In step 330, image-processing techniques are applied to remove this distortion. More specifically, the algorithm known as image blending or image feathering can be applied.

D. Segmentation

Figure 4:
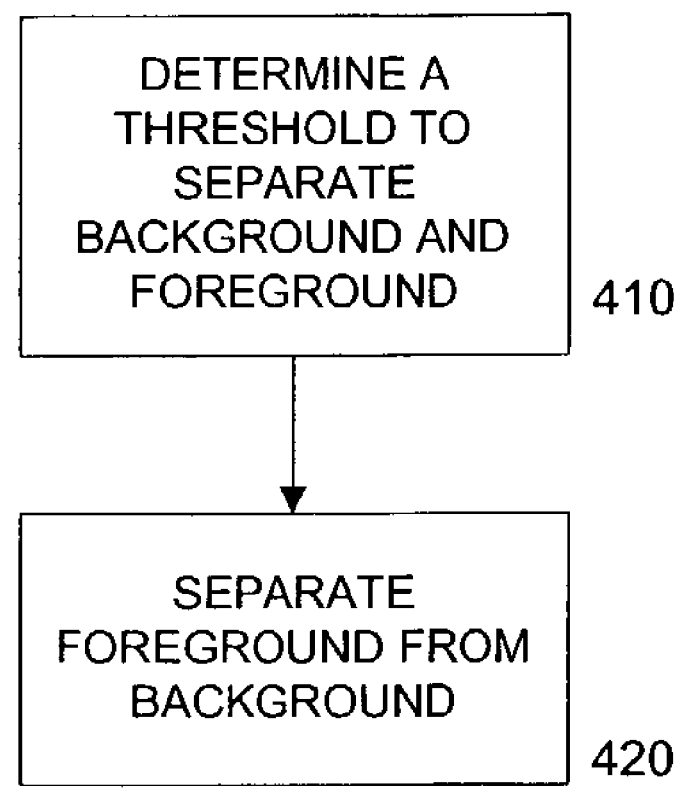
FIG. 4 provides a description of the method for foreground-background separation.

The depth image obtained in step 210 is processed in step 220 for segmentation of objects in the scene. In one embodiment, the foreground and the background can be separated from each other. FIG. 4 provides describes a method for foreground and background segmentation. In step 410, a threshold is determined to separate the foreground and the background. If there is a prior expectation of foreground, the background and foreground can be separated using a threshold that is aligned with this expectation. If there is no such expectation, the threshold to determine the close and far objects can be automatically determined. Here, standard segmentation algorithms could be used to group the pixels as foreground and background. For instance, and without any limitation, k-means algorithm (with k=2) is one of those methods to determine the centroid of the two classes. The threshold is given by the average of the centroids. The k-means algorithm is described in the book called Vector Quantization and Signal Compression by A. Gersho and R. M. Gray, published by Kluwer Academic Press, in 1992.

In another embodiment, a threshold is used on the gradient of depth, so that the value is less critical. For instance, Horowitz and Pavlidis's split-and-merge algorithm calculates a "homogeneity measure" by testing the gradient magnitude against a small number. The whole image is split into equal parts, and these are tested for homogeneity, if the regions are not homogeneous then the splitting continues until all the regions are homogeneous. Regions are then merged with other regions that are homogeneous with themselves. This method is described in the paper Picture Segmentation by a Tree Traversal Algorithm in the Journal of the Association of Computing Machinery, by Horowitz, S. L. and Pavlidis, in Vol. 23, 1976, pages 368–388.

In another embodiment, objects can be grouped according to their distances from the sensor and the foreground/background separation can be extended to more than two classes. One alternative is to use k-means algorithm, yet it is usually hard to determine apriori value for k. To overcome this problem, an adaptive scheme for the selection of k can be applied as described in PhD thesis titled "Shape Recognition with application to medical imaging", by Salih Burak Gokturk submitted to Stanford University in April 2002. In another embodiment, standard image segmentation methods such as described in the book titled Digital Image Processing by R. C. Gonzales, R. E. Woods, published by Addison Wesley, in 1993 can also be applied to find the segments that belong to objects at different depths.

E. Head Detection and Tracking

Head detection and tracking are important for applications where head or face is an object of interest in the scene. For instance, in a videophone, or videoconference application, the head of the subject is the most interesting object in the scene. In these cases, the face or head can be coded using high quality encoding. Head detection and tracking are used together to identify the head in the scene. Head detection is the algorithm that finds the head in an image. Head tracking is the algorithm that follows the head using the head's location and shape in the previous frame and finds its location in the new image.

Figure 5:
FIG. 5.$a$ illustrates an example of a depth image.
Figure 5:
Figure 5:
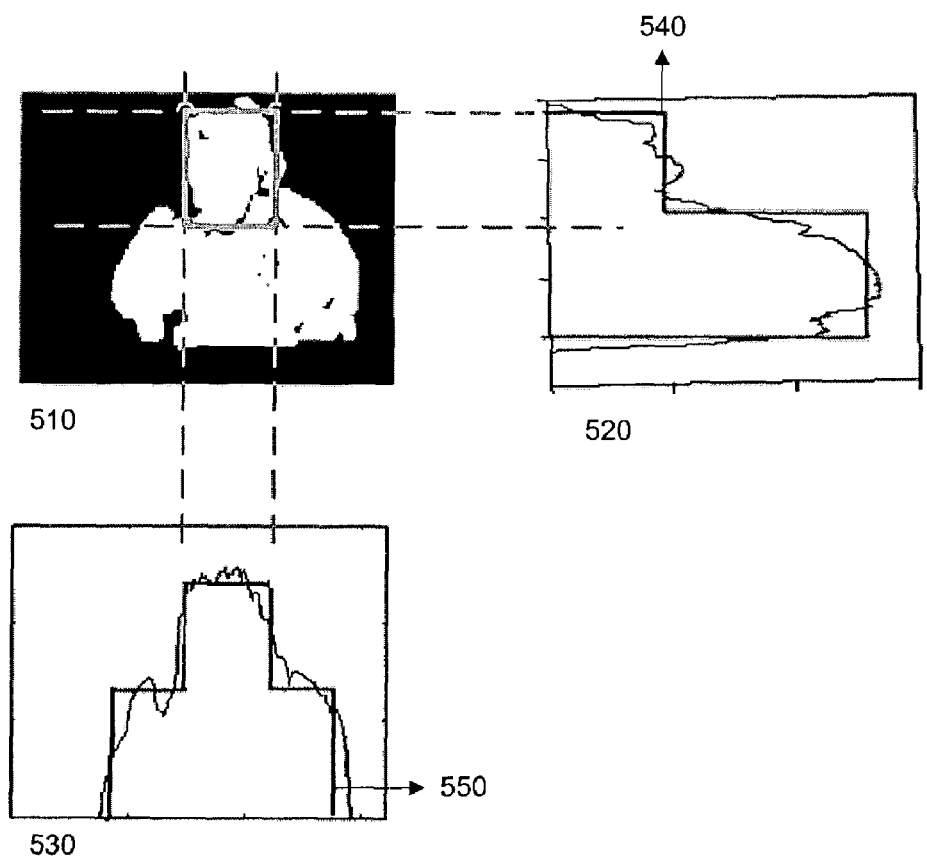

In a preferred embodiment, the face detection algorithm uses the body pattern to detect the location of the head and the body. FIG. 5A illustrates the depth image of an adult. FIG. 5B illustrates the binarized version of the image in FIG. 5A. In FIG. 5B, it can be observed that the head and shoulder are narrower than the body of the person. This pattern may be used to detect the head's location. Without any limitation, the head and body pattern can be detected using a histogram-based method as shown in FIG. 5C. In this method, the row-sum and column-sum of foreground pixel values in the binarized image 510 is obtained for each row and for each column. The patterns of the row and column pixel distributions contain information on the location of the head and shoulders, and also on the size of these features (i.e., small or big head, small or big shoulder, etc.). The row-sum and the column-sum of the image 510 are given in 520 and 530 respectively. The red plots 540 and 550 show the ideal corrected patterns. The window 560 is given as the location of the detected head, which is determined by the edge transitions of the plots 540 and 550. The main advantage of this method is its simplicity and efficiency.

Figure 6:
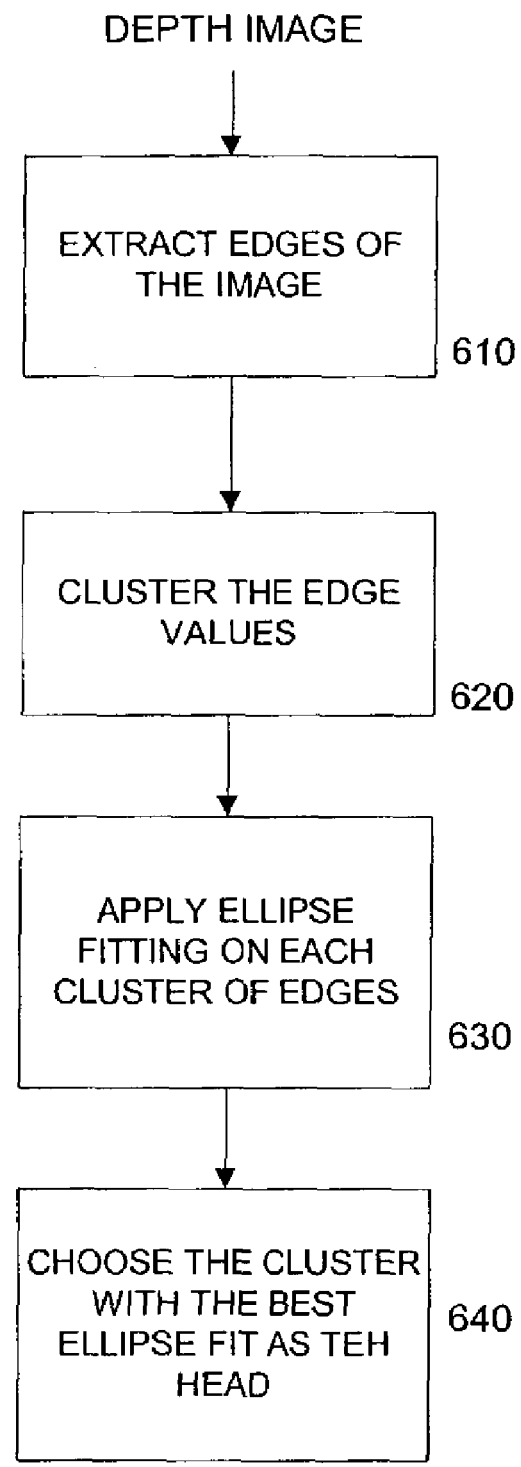
FIG. 6 illustrates an embodiment for the method of head detection using 3D sensing.

In another embodiment for face detection, an ellipsoid model is used for the head. The ellipsoid model could be both in three-dimensions or two-dimensions. FIG. 6 shows the steps of a method to apply ellipsoid based head detection. The boundary of the head is modeled as an ellipsoid. In step 610, the edges of the depth image are extracted. A standard edge detection algorithm such as Sobel edge detector, or Prewitt edge detector can be used to find these edges. In step 620, the edge values with similar depth values are grouped together. A clustering algorithm such as the k-means algorithm can be used to group these depth values. Ideally, a few k (k=2, 3, 4) values could be evaluated until the algorithm finds the best-fit head. Once the edges are grouped according to a similarity measure, e.g, based on their depth or location, connected-component analysis is applied to each group of edges. In step 630, an ellipse is fit on each connected component. In one embodiment, linear least square fit is used for this purpose. In step 640 segments that do not fit the quadratic model well is eliminated and the cluster with the best ellipse fit is declared as the head.

In another embodiment, a three-dimensional ellipsoid can be used to model the head. Three-dimensional ellipsoids are fit to group of adjacent pixels with similar depth values. The first step of the embodiment is to group adjacent pixels that have similar depth values. Image segmentation algorithms, that are available in literature can be used for that purpose. Once regions are clustered, a three-dimensional ellipsoid is fit to each region. Good ellipsoid fits with the expected size and aspect ratio of a head are declared as the detected head.

The literature contains various intensity based face detection algorithms. These algorithms can be used in addition to the aforementioned depth based methods. These methods first construct a very large database of images of faces, and non-faces. A training algorithm, such as neural networks, support vector machines, linear discriminant analysis, or hidden Markov models is executed to find a discriminating classifier function. Given a partition of an image, the classifier function determines if that partition contains an image of a face or not. While testing a new frame to see if it contains any faces, the image is first portioned in several ways (i.e. different sizes) into sub-images. Each sub-image is then fed to the classifier and tested to contain a face. Each positive test is declared as a face-detection.

Figure 7:
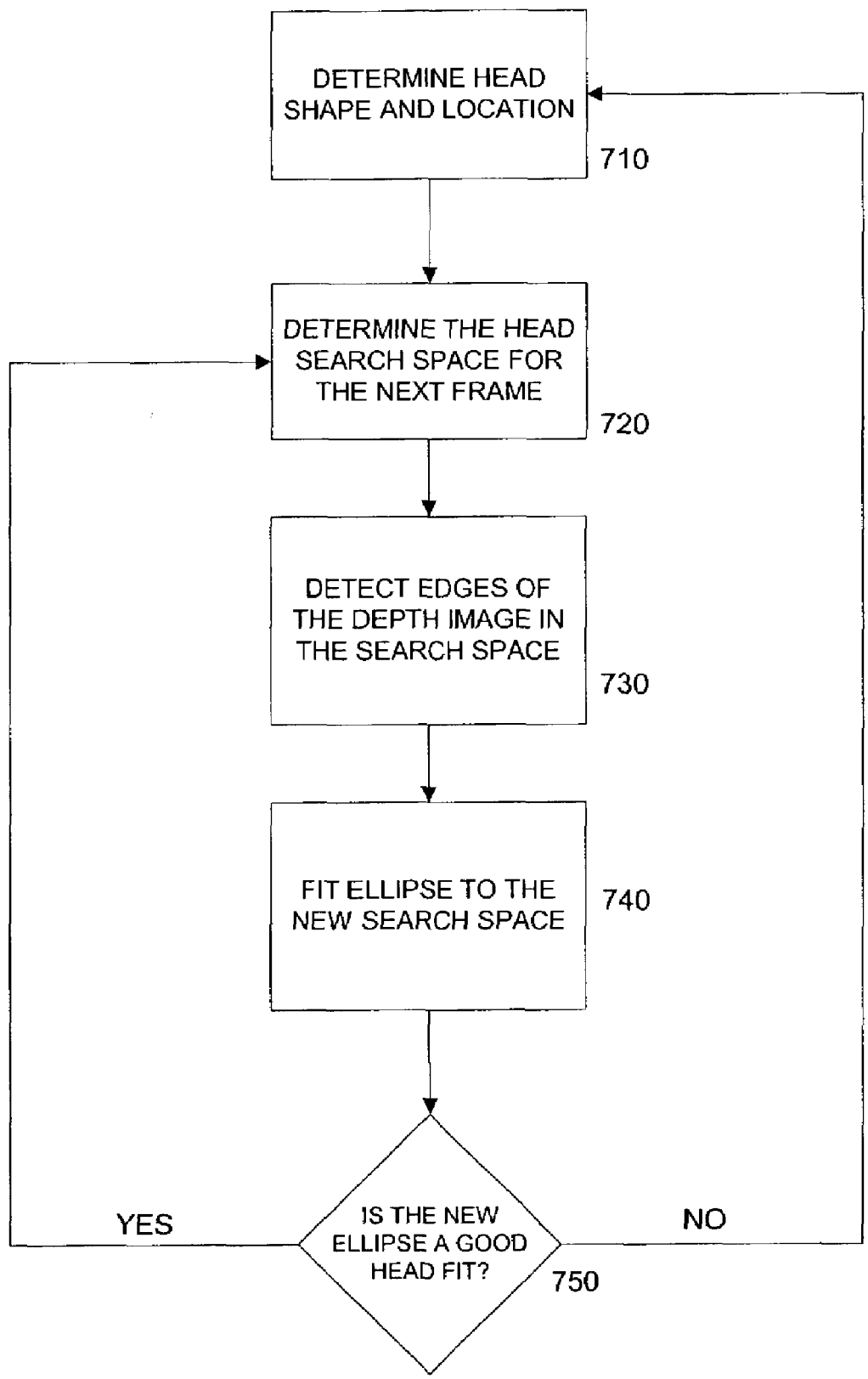
FIG. 7 illustrates an embodiment for the method of head tracking using 3D sensing.

Once the head is detected, the system gets into the tracking mode where the search space is only around the detected head, as opposed to the full image in the detection phase. FIG. 7 shows the steps of an embodiment for head tracking and detection algorithm with ellipsoid model. In step 710, the head location and shape (i.e. size) are determined using the head detection algorithm. In step 720, the head search space is determined for the next frame. Without any limitation, the new search space can be defined as a band around the ellipse of the previous frame. The width of this band can be between 10 to 100 pixels depending on the resolution of the image and the frame rate of the sensor. The initial ellipse model is now searched only in the new search space. In step 730, the edges of the depth image are determined in the search space. In step 740, an ellipse is fit to the edges that are in the search space. Without any limitation, linear least square fitting can be applied for ellipse fitting. Step 750 determines if the new ellipse is a good head fit. This is determined by first checking if the ellipse is a good fit with a small residue, and also comparing its size to the head size determined in detection. If the ellipse is not a good fit, then the system goes back to detection stage 710. If the ellipse is a good representative of the head then the system updates the new head location and goes to step 720 and continues to track the head.

F. Object Based Video/Image Compression

The separation of the foreground and the background, as well as the head location, may be used for object-based compression. For example, segmentation of people can be beneficial for video conferencing and video telephony applications. Once the foreground objects are determined, the background is encoded with very low rate compression or even not coded at all. The foreground can be coded such that the face of a person is coded using high quality, and the body of the person can be coded using medium quality. The arrangements of coding quality can be different depending on the application, and particular importance of objects in the scene.

The foreground objects can be coded by standard image/video compression algorithms. In the simplest terms, the background could be set to the same intensity level, e.g. 0 for black, and the resulting image, which contains the foreground only can be compressed by standard JPEG or MPEG compression. In the decoder side, the background can be replaced by an image of the user's desire. For instance, it can be replaced by an image of a beach or mountain, or it can be replaced with the still background image, or it can be replaced with a video of the user's choice.

If the application is image based, than 2D discrete cosine transformation (DCT), vector quantization (VQ), Wavelet transformation or principal component analysis (PCA) are some of the alternatives for image-based compression. In these methods, the foreground image is first divided into blocks. Each block is then coded with the associated transformation. The final stage of the encoder is the quantization of the transform coefficients. The decoder simply dequantizes the coefficients and constructs the compressed image by an inverse transformation.

In the video compression, motion compensated coding or direct three-dimensional transformations such as 3-D DCT, PCA or Wavelet transformations are examples of algorithms. In the motion compensated coding, each image is divided into blocks. Each block is predicted from the previous image by a motion vector. The residual block is coded by regular image compression schemes, i.e. two-dimensional DCT. In the three-dimensional Transformations, first a number of images are collected to construct stacks of images. Next, each stack is divided into three-dimensional blocks. The blocks are then coded by the transformations, and quantization is used to achieve compression. Different quantization steps are used for different objects (i.e. head versus body) to achieve different quality for different objects.

All the compression algorithms mentioned so far have taken their place in image and video coding standards such as protocols suggested by the Joint Picture Expert Group such as JPEG, JPEG2000, protocols suggested by the Moving Picture Expert Group such as MPEG2, MPEG4, MPEG7, MPEG21, Audio Video Interleave (AVI) coding standards, protocols recommended by International Telecommunications Union such as H.261, H.263, etc. These standards can be used to encode the foreground, and if necessary the background.

Another revenue of object-based methods is the use of object specific compression. For example, face based tracking and compression algorithms, such as described in the paper titled Analyzing Facial Expressions for Virtual Conferencing, authored by Peter Eisert and Bernd Girod, published in the journal IEEE Computer Graphics & Applications: Special Issue: Computer Animation for Virtual Humans, vol. 18, no. 5, pp. 70–78, September 1998, can be applied in video telephony applications. Here, once the model of the face is known, the images can be compressed by submitting only a few parameters, i.e. the rotation and translation of the face, and facial expression parameters.

G. Example Application: Using 3D Sensing Technology in Object Segmentation for Instant Messaging and Wireless/Wireline Video Conferencing Applications As described in the description of the invention, using image luminosity and depth (or only depth), the objects and subjects in the image can be segmented (partitioned) according to the distance from the camera. As an example, but without limitation, foreground object(s) consisting of the picture of one (or more) computer (or mobile device) user(s), say in an instance messaging (IM) application, in a video-telephony (VT) application, or in a video conferencing (VC) application, can be isolated and processed separately from the background information. The background can be transmitted less frequently or eliminated altogether. Similarly, body part's of the subject can be coded using different quality depending on the relevance of the body part. For instance, but without any limitation, the head of the subject can be coded with high quality and the body can be coded with medium quality. The player in the other end can combine the segments of the image to recover the entire (or part of the) image. Since the number of pixels in the foreground object is less than the number of pixels in the entire image, the overhead of processing, transmission and storage of the foreground section of the frame is less than the corresponding overhead for the entire image. This saving becomes significant in video streaming where 15 to 30 frames per second needs to be processed. The savings becomes even more significant considering the traffic that a huge population of on-line users, or cell phone users can produce in a network.

In an instant messaging (IM)) applications several thousand (millions) of people are typically exchanging brief text lines using a variety of electronic devices including desktop or portable PC, cell phones, PDAs and other emerging mobile devices. As the capabilities of client devices, servers and communication network increase, augmenting the text messages with other multimedia data such as images, video clips and sound is becoming more practical. Similarly, in video conferencing (VC), or video telephony (VT) applications, the voice communication is augmented with actual video stream of participants. In a cell phone based VT application, the total bandwidth of the cell network (even in the next generation cell phones) is quite limited. IM, VC and VT are of course only three examples of a breed of community-oriented applications where a large number of users are involved in exchanging data. The method described herein is also applicable to other similar application areas including email services, bulletin boards, SMS, auction sites (such as www.ebay.com), e-commerce sites, and electronic store fronts (such as Amazon).

Figure 8:
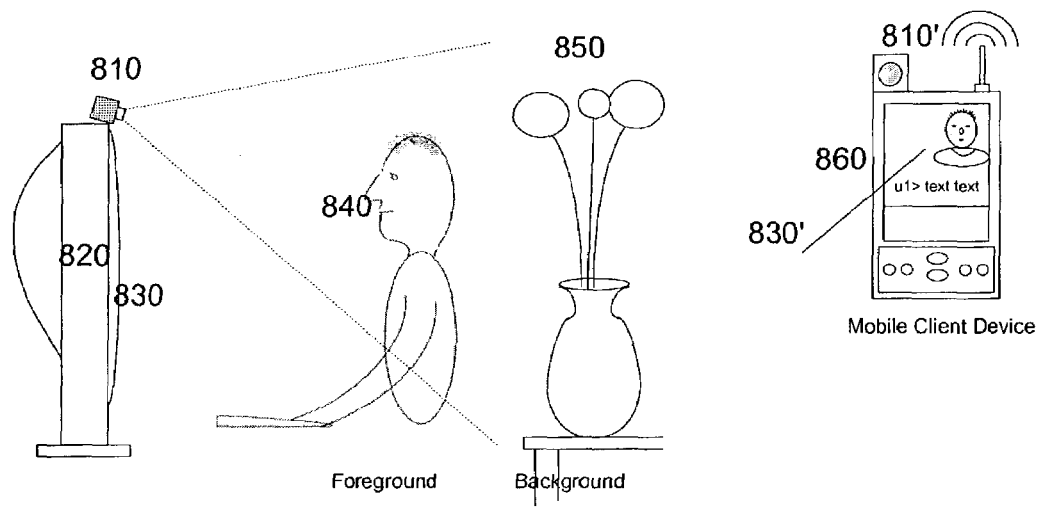
FIG. 8 illustrates an embodiment for the screen content of an IM application with actual live images.
Figure 8:
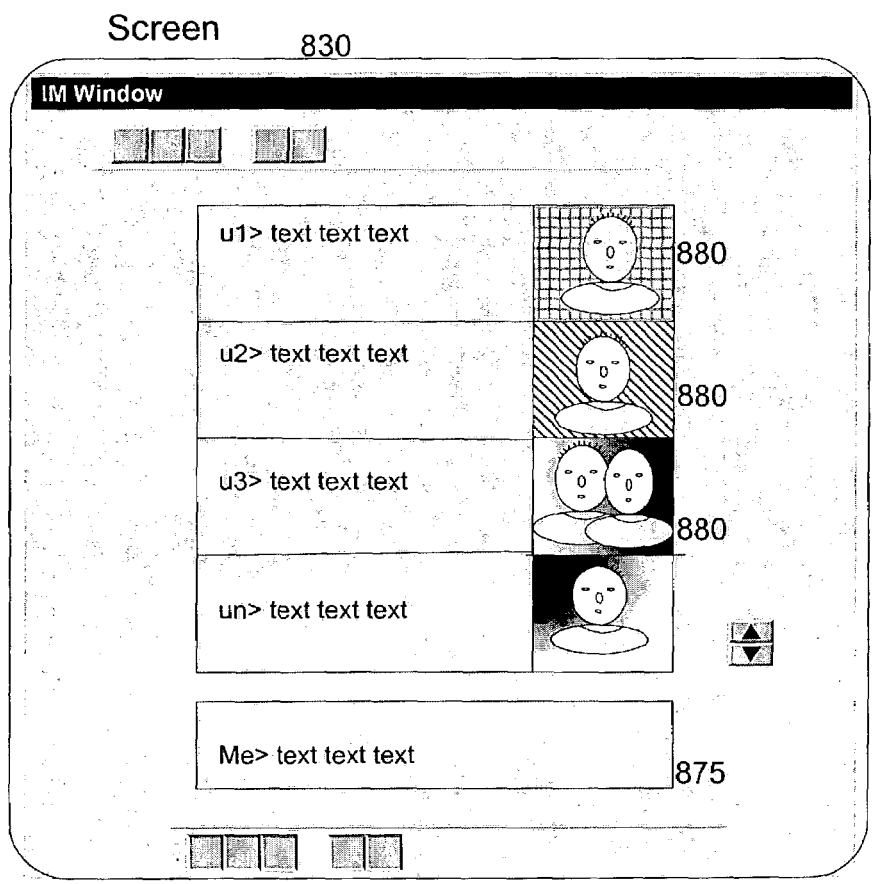

FIGS. 8A and 8B show a possible use of the system. Camera 810 which is equipped with a depth sensor captures the user 840 image on a desktop or a mobile device. The top or side of the monitor is a natural place to place the camera on a desktop computer 820 with a good view of the user. The desktop computer 820 contains at least a central processing unit 822, and a memory 824 storing at least one software routine. A more compact version of a similar camera can be integrated with or connected as an accessory to a mobile device such as a cell phone or a PDA 860.

Users of an instant message ("IM") service typically register with the IM service provider. The provider typically provides a server where the registration information about each user is stored. As part of the registration information, the service may store images of each user. The stored image is preferably taken by a three-dimensional camera. The image is preferably segmented so that the foreground and background information are clearly identified. This mode of encoding of the image enables the service provider to perform arbitrary operation on each segment. For instance, the background can be eliminated, or replaced by another background. Using a color-coded background may prove useful when images of many users appear on the screen of a client. For instance, the background color of the coordinator of an IM forum can be blue, whereas, the background color of the other users could be green. The background color can be used for other purposes such as identifying people with their geographic location, profession, affiliation, etc. For instance, the background color of forum participants from Utah can be SandyBrown.

FIG. 8C shows a more detailed screen content of an IM session with user images, under an embodiment. This is for the illustration purposes and the screen can be organized very differently in the actual application. The bottom rectangle 875 is designated for the typing field. The messages from the other users either appear in the same rectangle or in their respective rectangles next to their images 880.

Providing a real-time feed of user video images can enhance this application. A real-time video images 880 of users can be continuously displayed in their segment of screen. To conserve bandwidth, the server may choose to stream the video of select users among the participants in the forum (e.g. the person who is typing). Camera 810 captures the user image in real-time. Using the depth information, client computer (e.g. a desktop or mobile device) locally performs a segmentation of the image based on the methods described in the earlier sections. As a result, the image can be partitioned into layers each consisting of clusters of one or more objects at each layer. A special case of image layering is to identify a foreground object 840 and the background 850. The foreground object in this case is the user (consisting of face, neck and a part of body), and the background scene consists of the wall, flower vase, etc. There are a number of benefits in segmenting the image into objects as follows:

(1) Instead of transmitting the entire image, only the relevant segment (in this case, the foreground picture of the user) is compressed and transmitted. For instance, if the size of the segment were 50% of the entire image, there would be an immediate corresponding saving in the bandwidth required to transmit the user face (compared to transmitting the entire image). For instance, in the IM, VC or VT application, the pictures appearing on the client screen 830 can consists of only the foreground segment of the image.

(2) By identifying different objects in the image, the image processing software (either at client or server) can perform segment-specific processing. The image is broken down into objects at the source and reconstructed at the destination. One useful image processing technique is image substitution. For instance, the background can be substituted by another image. In an IM application, the background of user images could be colored or textured based on their role in the group conversation or message exchange. Similarly in VC or VT application, the background can be replaced by a still image, or by a video.

(3) By identifying different objects in the image, different compression techniques and quality could be used for different segments of the image. Compression standards such as Motion Picture Expert Group 4 (MPEG4) are specifically designed to take advantage of image segmentation. Since, presumably, the background content is either stationary or not very useful (in certain applications), it can be transmitted with a coarse resolution or/and less frequent (i.e. lower frame rate) compared to the foreground segment.

Identifying objects in an image is the first step in performing more comprehensive image processing to determine identity of a user or detect facial impressions such as happy face, sad face, puzzled face, etc. One can take this one step further and translate the face impression of the user to set of predefined avatars that represent the mood of the user. Avatars are symbols that are typically interspersed with text as a short cut symbol or to spice up the text for conveying, say, user emotion. Examples include these common symbols:☺ happy, ☺ indifferent, and ☹ sad.

Using the current invention, one can design an IM application where the user's facial impression is translated to an avatar and transmitted as part of the user message. First, the camera captures the user image. By performing an image-processing algorithm, either on the local computer or a connected server (by first sending the image to server), a computer program analyses the facial impression of the user. The computer program maps the user impression to one of the predefined facial emotions represented with corresponding avatar. The computer program can be a client application that is part of, say, a browser plug-in. This plug-in can be distributed to the users of IM service. One advantage of running this program in the client is that the raw image needs not to be transmitted to server (or the other user). There would be a tremendous amount of saving in the bandwidth requirement if rather than sending the entire picture, a code word identifying the avatar is sent to the server (and eventually, the other users). In the receiving computer, a table is maintained that maps the code to the stored image of the avatar. This table is used to map the code back to the avatar representing the facial impression of the sender. Instead of a code word, the application may choose to send the image of the avatar.

In order to find the facial expressions, image processing would be applied on the images obtained by the camera. Tracking critical feature points on the face can identify the expressions of the user. A method that uses feature tracking for this purpose has been explained in the paper titled "Model-Based Face tracking for View-Independent Facial Expression Recognition" authored by S. B. Gokturk, J. Y. Bouguet, C. Tomasi, B. Girod, and published in the proceedings of the IEEE fifth international conference on Face and Gesture Recognition, 287, 2002. Among the critical features are the eyes, the tip of the nose, and corner points of the mouth, and the eyebrows. The critical points can be tracked either in two-dimensions or three-dimensions. The use of depth images would simplify the matching process. More specifically, the nose and the eyes are given as the hills and the valleys in the depth image. Once those critical features are found, the locations of the mouth, and the eyebrows can be roughly guessed and searched in their neighborhood in the intensity images. For this purpose, generic pattern matching algorithms can be used as described in the book titled Pattern Classification and Scene Analysis, authored by R. Duda and P. Hart, published by Wiley-Interscience Publication, 1973.

The recognition of the facial expression comes as the next step. In an embodiment, a training set is collected first over different faces performing various facial expressions. Next, a classifier function is learnt on the input set using a training algorithm. Among the possible training algorithms are the principal component analysis, nearest neighbor classifier, neural networks, support vector machines, and hidden Markov models. The training algorithm provides a classifier function, which classifies the expression given an input image. The classifier function can then be used on an IM application for learning the expression of its users.

K. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for enabling segmentation of objects and subjects in an image captured by a camera system capable of obtaining both luminosity and depth information, the method comprising:
   obtaining position information for a plurality of discrete regions on at least one of a head and a body part of a subject and on a background behind said subject;
   segmenting the image into at least a first segment corresponding to a first object in the image and into a second segment corresponding to a second object in the image, at least one of the first object and the second object corresponding to at least one of the head and the body part of the subject;
   identifying a position and a shape of at least one of the head and the body part of the subject; and
   applying a first compression scheme to the first segment of the image, and a second compression scheme to the second segment of the image.

2. The method of claim 1, wherein the step of obtaining position information includes using one of a time-of-flight based three-dimensional sensor, a stereo-vision three-dimensional sensor, a structured light three-dimensional sensor, a depth-from-focus three-dimensional sensor.

3. The method of claim 1, wherein the step of segmenting the image includes identifying at least one of a foreground object and a background object from the image.

4. The method of claim 1, wherein the step of segmenting the image includes clustering pixels together based at least partially on a depth of a discrete region of each of the first object and the second object from a reference.

5. The method of claim 4, wherein clustering pixels includes executing a k-means algorithm.

6. The method of claim 4, wherein clustering pixels includes executing a split-and-merge algorithm.

7. The method of claim 4, wherein clustering pixels includes grouping a plurality of detected depth values as either a foreground object or a background object.

8. The method of claim 7, wherein grouping a plurality of detected depth values includes using a prior expectation of depth values of the foreground and background objects.

9. The method of claim 7, wherein grouping a plurality of detected depth values includes using k-means algorithm with a k value of 2.

10. The method of claim 1, wherein identifying a position and a shape of at least one of the head and the body part of the subject includes the steps of:
    determining an initial location, a shape and a size of said head; and
    tracking the head to determine the location of the head in a series of consecutive frames.

11. The method of claim 10, wherein determining an initial location, a shape and a size of said head includes the steps of:
    obtaining a row-sum and a column-sum of a plurality of foreground pixels in the image;
    identifying multiple edges of said row-sum and column-sum distributions;
    finding one or more bounding boxes of the head by an intersection of said multiple edges of said row-sum and column-sum distributions.

12. The method of claim 10, wherein determining an initial location, a shape and a size of said head includes the steps of:
    obtaining a plurality of edge values from said image, the plurality of edge values corresponding to multiple edges of said objects;
    clustering the plurality of edge values that have similar depth values into one or more groups of edge values;
    fitting an ellipse to each of the groups of edge values;
    identifying which group in the one or more groups has an ellipse of a designated criteria; and
    designating the group with the ellipse with the designated criteria as the head of the subject.

13. The method of claim 12, wherein obtaining a plurality of edge values from said image includes using a standard edge detection algorithm on said image.

14. The method of claim 12, wherein clustering the plurality of edge values includes using k-means algorithm with a predefined value of k.

15. The method of claim 12, wherein fitting an ellipse to each of the groups of edge values includes using linear least-square fit to one or more of the edge's locations.

16. The method of claim 10, wherein determining an initial location, a shape and a size of said head includes executing an intensity based face detection algorithm.

17. The method of claim 10, wherein determining an initial location, a shape and a size of said head includes modeling a human head as one or more three-dimensional ellipsoids.

18. The method of claim 17, further comprising of the steps of:
    clustering adjacent pixels forming image and which have similar depth values into groups; and
    fitting a three-dimensional ellipsoid to each said group of said pixels.

19. The method of claim 10, wherein tracking the head includes the steps of:
    determining a head search space using a current frame to be used for a next frame;
    obtaining one or more edges of the image in said head search space;
    fitting an ellipse to the one or more edges.

20. The method of claim 19, wherein determining a head search space includes defining said head search space as a band around the ellipse for the head location in said current frame.

21. The method of claim 19, wherein fitting an ellipse to the one or more edges includes executing a linear least-square fit algorithm using the one or more edges.

22. The method of claim 1, wherein the step of applying the first compression scheme and the second compression scheme includes using different compression algorithms, wherein the compression algorithm of the first compression scheme has a quality that is different than the compression algorithm of the second scheme.

23. The method of claim 1, wherein the step of applying the first compression scheme and the second compression scheme includes applying the first compression scheme to a foreground portion of the image, and a second compression scheme to a background portion of the image.

24. The method of claim 23, wherein the first compression scheme has a first compression algorithm, and wherein the second compression scheme has a second compression algorithm that is different than the first compression algorithm, and wherein the second compression algorithm has a different quality than the first compression algorithm.

25. The method of claim 1, wherein the step of applying the first compression scheme and the second compression scheme includes applying on each segment one or a combination of compression schemes selected from a group consisting of (i) a two-dimensional discrete cosine transformation; (ii) vector quantization; (iii) wavelet transformation;

(iv) principal component analysis; (v) motion compensated coding; (vi) three-dimensional discrete cosine transformation; (vii) three-dimensional principal component analysis; and (viii) three-dimensional wavelet transformation.

26. The method of claim 1, wherein the step of applying the first compression scheme and the second compression scheme includes applying on the first segment and the second segment a protocol selected from the group of (i) Joint Photographic Experts Group (JPEG); (ii) Joint Photographic Experts Group 2000 (JPEG2000); (iii) Moving Picture Expert Group 2 (MPEG2); (iv) Moving Picture Expert Group 4 (MPEG 4); (v) Moving Picture Expert Group 7 (MPEG 7); (vi) Moving Picture Expert Group 21 (MPEG 21); (vii) Audio Video Interleave (AVI); (viii) protocols recommended by International Telecommunications Union (H.261 and H.263).

27. The method of claim 23, wherein the step of applying the first compression scheme and the second compression scheme includes applying on each segment one or a combination of compression schemes selected from a group consisting of (i) a two-dimensional discrete cosine transformation; (ii) vector quantization; (iii) wavelet transformation; (iv) principal component analysis; (v) motion compensated coding; (vi) three-dimensional discrete cosine transformation; (vii) three-dimensional principal component analysis; and (viii) three-dimensional wavelet transformation.

28. The method of claim 23, wherein the step of applying the first compression scheme and the second compression scheme includes applying on the first segment and the second segment a protocol selected from the group of (i) Joint Photographic Experts Group (JPEG); (ii) Joint Photographic Experts Group 2000 (JPEG2000); (iii) Moving Picture Expert Group 2 (MPEG2); (iv) Moving Picture Expert Group 4 (MPEG 4); (v) Moving Picture Expert Group 7 (MPEG 7); (vi) Moving Picture Expert Group 21 (MPEG 21); (vii) Audio Video Interleave (AVI); (viii) protocols recommended by International Telecommunications Union (H.261 and H.263).

29. The method of claim 1, wherein the step of applying the first compression scheme and the second compression scheme includes using object-specific compression.

30. The method of claim 1, further comprising transmitting the image over a communication channel using at least the first compression scheme and the second compression scheme.

31. The method of claim 30, wherein said communication channel includes a channel selected from a group consisting of a telephone line, a local area network, a wide area network, a digital subscriber line, and a wireless media.

32. The method of claim 1, further comprising the step of storing the compressed first segment and the compressed second segment in a computer-readable medium.

33. The method of claim 32, wherein said computer-readable medium is selected from a group consisting of a hard disk, a storage tape, random access memory, and read-only memory.

34. The method of claim 30, further comprising:
transmitting the compressed image over a communication channel to a receiver, where the receiver includes a processor for decompressing compressed images;
receiving and decompressing the compressed image;
applying a background processing;
applying image processing to improve the decompressed image; and
displaying the image.

35. The method of claim 34, wherein applying a background processing includes substituting as a background, one of a static image, a static image of the background where the image was taken, a static video, and any static color.

36. The method of claim 34, wherein applying image processing includes applying image blending and feathering to the image.

37. A system for enabling segmentation of objects and subjects using images obtained by a three-dimensional sensor and enabling object-based compression of segmented said objects and subjects, the system comprising:
a host device including a processor and a memory, the memory storing one or more modules that are executable by the processor;
a camera system capable of obtaining an image with luminosity and depth information;
a communication interface for transmitting the image;
wherein the module is executable by the processor in order to:
segment the image into at least a first segment corresponding to a first object in the image and into a second segment corresponding to a second object in the image, at least one of the first object and the second object corresponding to at least one of the head and the body part of the subject;
identify a position and a shape of at least one of the head and the body part of the subject; and
apply a first compression scheme to the first segment of the image, and a second compression scheme to the second segment of the image.

38. The system of claim 37, wherein the host device is a device selected from a group consisting of a personal computer, a laptop computer, a personal digital assistant, a cellular phone, a land-line phone, a pen tablet computer; and a screen.

39. The system of claim 38, further comprising a sensor to obtain depth information with the image, wherein the sensor is selected from a group consisting of a time-of-flight based three-dimensional sensor, a stereo-vision three-dimensional sensor, a structured light three-dimensional sensor, and a depth-from-focus three-dimensional sensor.

40. The system of claim 37, wherein the communication interface is selected from a group consisting of a telephone line, a local area network, a wide area network, a digital subscriber line, and a wireless medium.

* * * * *